United States Patent
Uesugi et al.

(10) Patent No.: US 11,277,561 B2
(45) Date of Patent: Mar. 15, 2022

(54) IMAGE STABILIZATION APPARATUS AND METHOD, AND IMAGE CAPTURING APPARATUS

(71) Applicant: CANON KABUSHIKI KAISHA, Tokyo (JP)

(72) Inventors: Tomomi Uesugi, Kawasaki (JP); Koichi Washisu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 16/892,225

(22) Filed: Jun. 3, 2020

(65) Prior Publication Data

US 2020/0389594 A1 Dec. 10, 2020

(30) Foreign Application Priority Data

Jun. 4, 2019 (JP) .............................. JP2019-104795

(51) Int. Cl.
*H04N 5/232* (2006.01)
*G06T 7/246* (2017.01)

(52) U.S. Cl.
CPC ......... *H04N 5/23267* (2013.01); *G06T 7/248* (2017.01); *H04N 5/23254* (2013.01)

(58) Field of Classification Search
None
See application file for complete search history.

(56) References Cited

U.S. PATENT DOCUMENTS

| 6,556,246 | B1* | 4/2003 | Suda ................ H04N 5/232127 |
| | | | 348/352 |
| 2012/0093493 | A1* | 4/2012 | Wakamatsu ....... H04N 5/23287 |
| | | | 396/55 |
| 2016/0316146 | A1* | 10/2016 | Kajimura ........... H04N 5/23254 |
| 2017/0026580 | A1* | 1/2017 | Gyotoku ............ H04N 5/23258 |
| 2017/0347032 | A1* | 11/2017 | Kajimura ........... H04N 5/23245 |

FOREIGN PATENT DOCUMENTS

JP 2004-015376 A 1/2004

* cited by examiner

*Primary Examiner* — Cynthia Segura
(74) *Attorney, Agent, or Firm* — Cowan, Liebowitz & Latman, P.C.

(57) ABSTRACT

An image stabilization apparatus comprises: a first extraction unit that extracts first signals of a plurality of different frequency components from each of a plurality of motion vectors obtained from an image signal output from an image sensor; a second extraction unit that extracts second signals of the plurality of different frequency components from a detection signal of a detected shake of an apparatus; an acquisition unit that acquires correlation values between the first signals of the plurality of motion vectors and the second signal for each of the frequency components; a selection unit that selects at least one of the plurality of motion vectors based on the correlation values each for each of the frequency components; and an image stabilization unit that performs image stabilization using the motion vector selected by the selection unit.

8 Claims, 12 Drawing Sheets

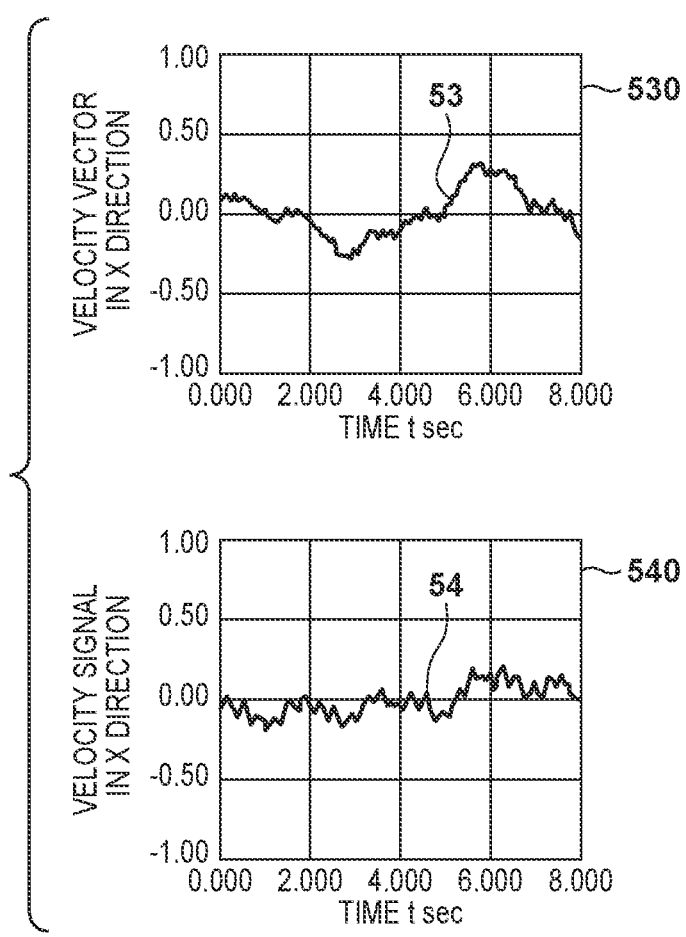
F I G. 5C

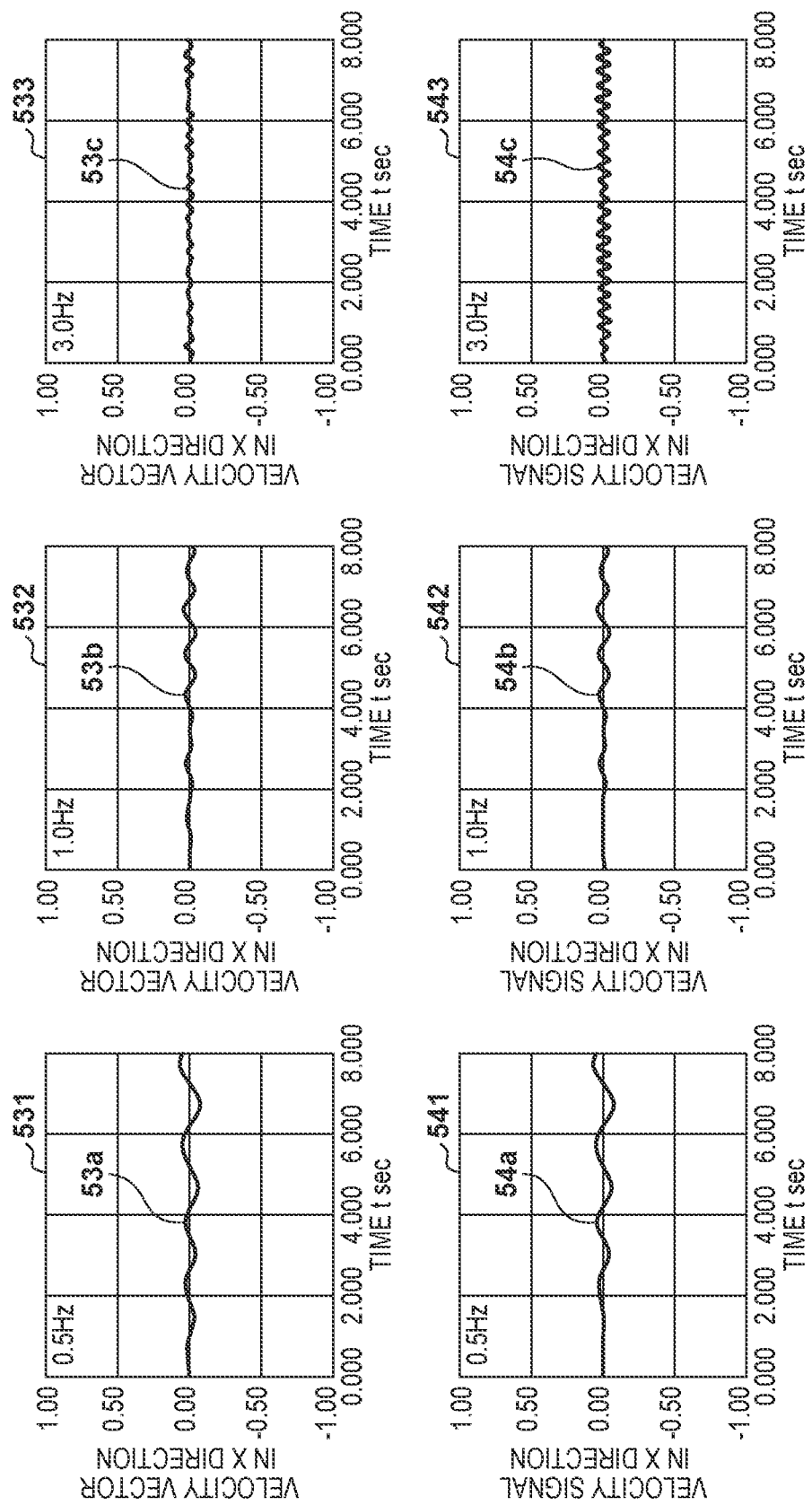

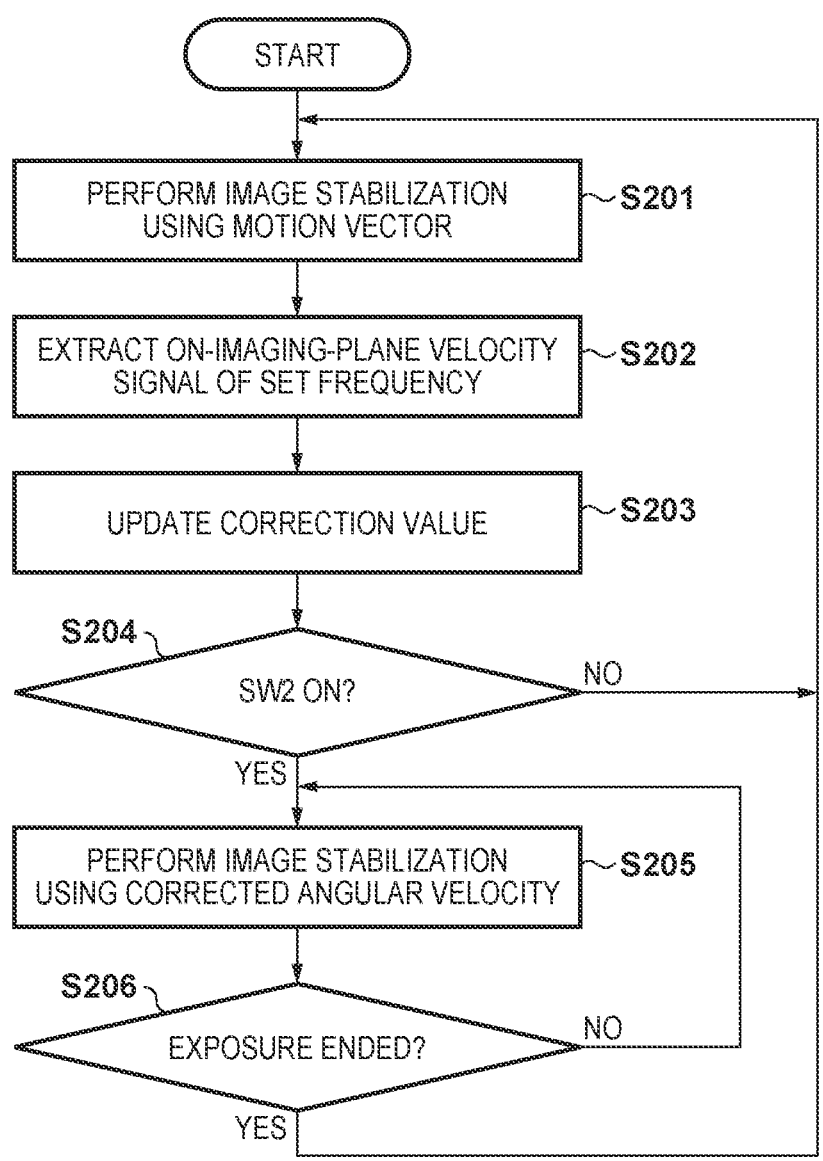

IMAGE STABILIZATION APPARATUS AND METHOD, AND IMAGE CAPTURING APPARATUS

BACKGROUND OF THE INVENTION

Field of the Invention

The present invention relates to an image stabilization apparatus and method and an image capturing apparatus.

Description of the Related Art

Conventionally, there is an image stabilization apparatus that detects a motion vector from a plurality of images sequentially output from an image sensor and suppresses image blur based on the detected motion vector.

Japanese Patent Laid-Open No. 2004-15376 discloses a following method of detecting a motion vector. That is, a captured image is divided into a plurality of areas, and among motion vectors of the respective areas, only the motion vectors within a range determined by the average value and the standard deviation of the motion vectors of the respective areas are selected. Further, the contrast coefficient of each area is obtained. Then, a weighting coefficient is obtained based on the obtained contrast coefficient of each area, and then a weighted average of the selected motion vectors is obtained as the motion vector of the captured image. In the above manner, it is possible to evaluate the degree of reliability and the motion vector of the captured image can be accurately obtained.

However, although Japanese Patent Laid-Open No. 2004-15376 is to obtain a highly reliable motion amount and direction by operating the vectors of the respective areas, there are various error vectors on an image plane due to noise, movement of a subject, change in magnification, distance to the subject, and so on, which cannot be separated accurately. For this reason, there is a problem that highly accurate image stabilization cannot be performed.

SUMMARY OF THE INVENTION

The present invention has been made in consideration of the above situation, and highly accurate image stabilization is performed by selecting an appropriate motion vector or vectors from motion vectors of multiple subjects included in an image which are detected for image stabilization.

According to the present invention, provided is an image stabilization apparatus comprising: a first extraction unit that extracts first signals of a plurality of different frequency components from each of a plurality of motion vectors obtained from an image signal output from an image sensor; a second extraction unit that extracts second signals of the plurality of different frequency components from a detection signal of a detected shake of an apparatus; an acquisition unit that acquires correlation values between the first signals of the plurality of motion vectors and the second signal for each of the frequency components; a selection unit that selects at least one of the plurality of motion vectors based on the correlation values each for each of the frequency components; and an image stabilization unit that performs image stabilization using the motion vector selected by the selection unit, wherein each unit is implemented by one or more processors, circuitry or a combination thereof.

Further, according to the present invention, provided is an image capturing apparatus comprising: an image stabilization apparatus having: a first extraction unit that extracts first signals of a plurality of different frequency components from each of a plurality of motion vectors obtained from an image signal output from an image sensor; a second extraction unit that extracts second signals of the plurality of different frequency components from a detection signal of a detected shake of an apparatus; an acquisition unit that acquires correlation values between the first signals of the plurality of motion vectors and the second signal for each of the frequency components; a selection unit that selects at least one of the plurality of motion vectors based on the correlation values each for each of the frequency components; and an image stabilization unit that performs image stabilization using the motion vector selected by the selection unit; and the image sensor, wherein each unit is implemented by one or more processors, circuitry or a combination thereof.

Furthermore, according to the present invention, provided is an image stabilization method comprising: extracting first signals of a plurality of different frequency components from each of a plurality of motion vectors obtained from an image signal output from an image sensor; extracting second signals of the plurality of different frequency components from a detection signal of a detected shake of an apparatus; acquiring correlation values between the first signals of the plurality of motion vectors and the second signal for each of the frequency components; selecting at least one of the plurality of motion vectors based on the correlation values each for each of the frequency components; and performing image stabilization using the selected motion vector.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 5A to 5D are explanatory diagrams of band division of a velocity vector and degrees of correlation according to the first embodiment;

FIG. 10 is a flowchart of an image stabilization processing according to the second embodiment.

DESCRIPTION OF THE EMBODIMENTS

Figure 1:
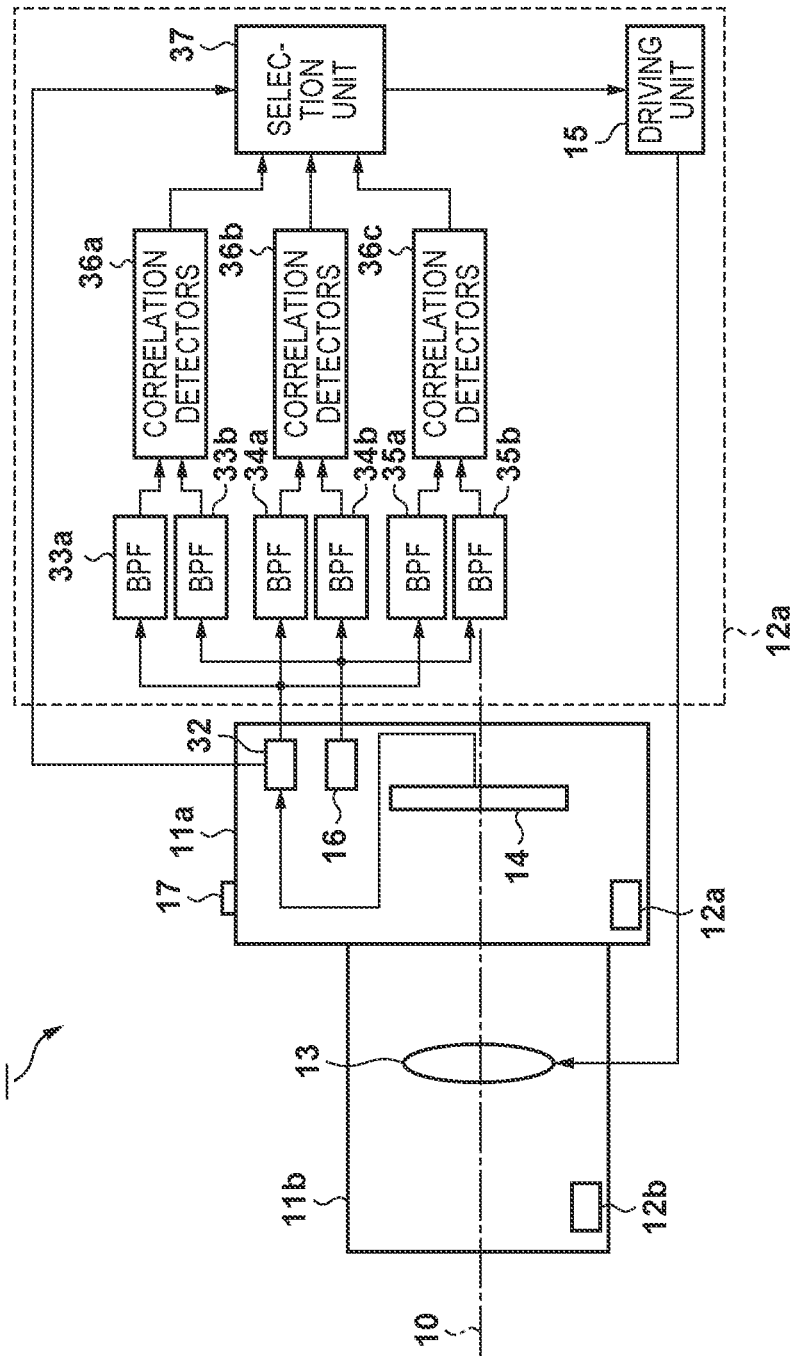
FIG. 1 is a block diagram illustrating a control configuration of an image stabilization system in an image capturing system according to a first embodiment of the present invention.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram illustrating a control configuration of an image stabilization system in an image capturing system 11 which includes a camera body 11a and an interchangeable lens 11b used by being attached to the camera body 11a according to a first embodiment.

A camera CPU 12a provided in the camera body 11a controls the entire operation of the image capturing system 11, including an image stabilization operation in the camera body 11a, in response to a shooting instruction operation or the like by a photographer. Note, the contents of the calculation operation performed by the camera CPU 12a are shown within a box of a dotted line 12a outside the camera body 11a so as to be easily seen.

Further, a lens CPU 12b provided in the interchangeable lens 11b controls the entire operation of the interchangeable lens 11b including the image stabilization operation in the interchangeable lens 11b in response to a shooting instruction from the camera body 11a.

An imaging optical system (not shown) included in the interchangeable lens 11b includes an image stabilizing lens 13 and performs image stabilization by driving the image stabilizing lens 13 in accordance with an image stabilizing signal from the camera body 11a. A light flux of a subject along an optical axis 10 is incident on an image sensor 14 via the photographing optical system having the image stabilizing lens 13, and the image sensor 14 outputs an image signal corresponding to the incident light flux of the subject. The image signal output from the image sensor 14 is subjected to image processing, and the obtained image data is used for recording and display.

A motion vector detection unit 32 obtains a motion vector for each subject included in an image from the image signal output from the image sensor 14.

Figure 2:
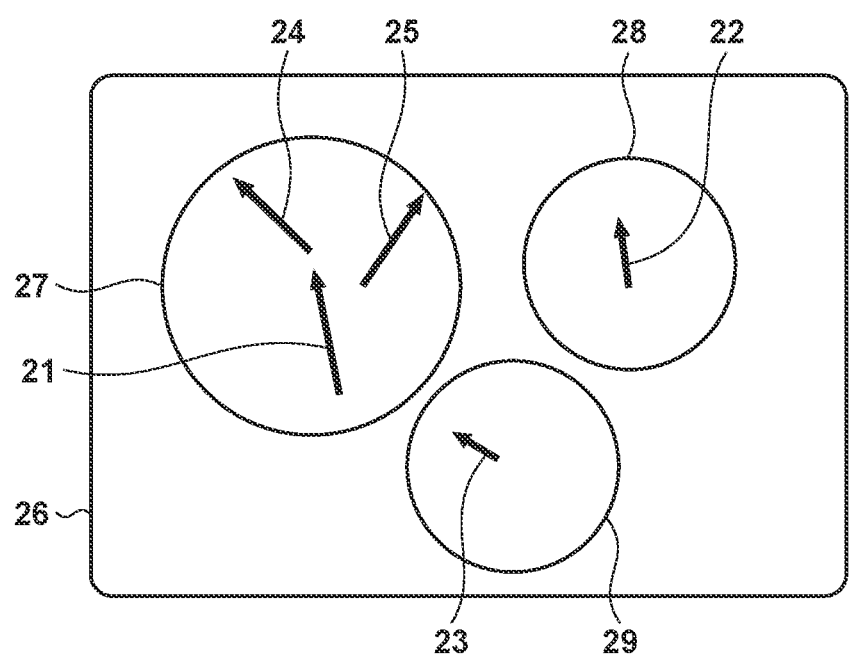
FIG. 2 is a diagram showing a distribution example of motion vectors according to the first embodiment.

Here, the error of the motion vector will be described. FIG. 2 shows motion vectors of respective subjects obtained by the motion vector detection unit 32. Here, as an example, in an imaging region 26, motion vectors of a main subject 27 on the near side, a distant subject 28, and a dark subject 29 are shown. Here, the vector 21 of the main subject 27 is a motion vector representing the direction and amount (scalar value) of the shake to be corrected on the image plane. On the other hand, with respect to the distant subject 28, the direction of the shake indicated by the vector 22 is the same as that of the vector 21, but the amount of the shake (scalar value) indicated by the vector 22 is smaller than that of the vector 21. This is because, when translational shake occurs in the camera body 11a, the vector corresponding to the shake becomes larger as the distance from the camera body 11a to a subject is shorter. In addition, with respect to the vector 23 of the dark subject 29, a correct motion vector is not obtained because noise is superimposed on the vector 23.

When the subject moves back and forth along the shooting direction of the camera body 11a, or when the camera body 11a moves back and forth along the shooting direction, since the image magnification changes, vectors corresponding to the change in the image magnification occur in the radial direction from the center of the imaging screen. A vector generated by adding this vector to the motion vector 21 representing a shake to be corrected on an image plane is represented as a motion vector 24. Further, when the main subject 27 moves, a vector is generated by the movement. A vector generated by adding this vector to the motion vector 21 is represented as a motion vector 25.

As described above, since the motion vector changes due to various factors, the image stabilization ability changes. Therefore, it is preferable to select a motion vector or vectors representing a correct shake using information other than the amount and direction of the motion vector, and perform image stabilization based on the selected vector or vectors.

Accordingly, in the present embodiment, a motion vector or vectors representing a shake to be corrected is/are selected using the frequency information of the motion vectors, and image stabilization is performed. Specifically, a motion vector or vectors having a correlation with a detection signal of a vibration detection device such as an acceleration sensor in a specific frequency band is/are selected, and image stabilization is performed using image information of an area or areas where the selected motion vector or vectors exists/exists.

In FIG. 1, an acceleration signal output from an acceleration detection unit 16 is first-order integrated by an integrator (not shown), converted into a velocity signal, and then divided into band signals by a plurality of band-pass filters 33b, 34b, and 35b. The band-pass filters (BPF) 33b, 34b, and 35b have characteristics of extracting frequency components of 0.5 Hz, 1 Hz, and 3 Hz, respectively, as an example in the present embodiment. The velocity signals of different bands divided by the BPFs 33b, 34b, and 35b are input to correlation detectors 36a, 36b, and 36c, respectively.

On the other hand, the motion vector detection unit 32 obtains the motion vectors 21 to 25 in the example shown in FIG. 2 from the image signal output from the image sensor 14, and further obtains velocity vectors 21' to 25' indicating the change in each motion vector over time. Each of the obtained velocity vectors is divided into band signals by a plurality of BPFs 33a, 34a, and 35a. The BPFs 33a, 34a, and 35a corresponds to the BPFs 33b, 34b, and 35b, respectively, and also have characteristics of extracting frequency components of 0.5 Hz, 1 Hz, and 3 Hz, respectively, as an example in the present embodiment. The velocity signals of different bands divided by the BPFs 33a, 34a, and 35a are input to the correlation detectors 36a, 36b, and 36c, respectively.

Figure 4:
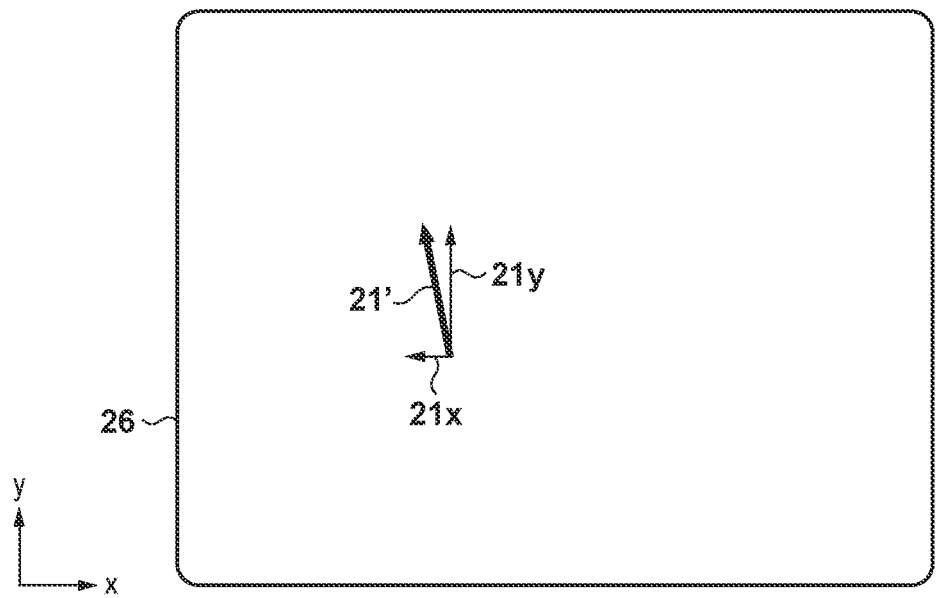
FIG. 4 is an explanatory diagram for separating a motion vector into directions according to the first embodiment.

The acceleration detection unit 16 performs detection in the directions along two orthogonal axes (x direction, y direction) on the imaging surface. To match with these directions, each velocity vector is also decomposed in the x and y directions as shown in FIG. 4. For example, the velocity vector 21' obtained from the motion vector 21 is decomposed into an x component and a y component as indicated by arrows 21x and 21y. Then, the velocity vector and the velocity signal are separately processed by the BPFs 33a, 34a, and 35a and the BPFs 33b, 34b, and 35b for the x direction and the y direction, and then input to the correlation detectors 36a, 36b, and 36c.

Figure 5A:
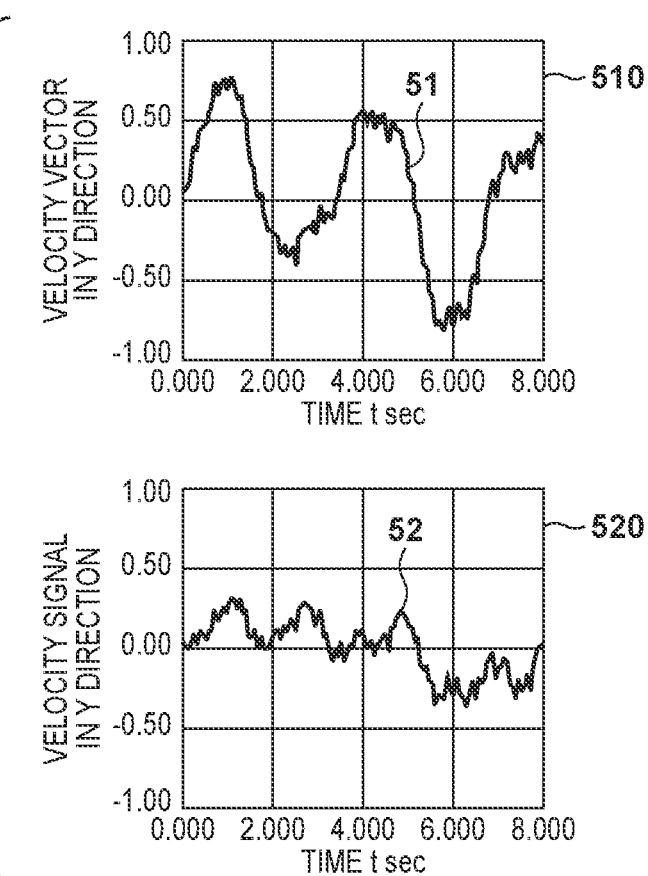
Figure 5B:
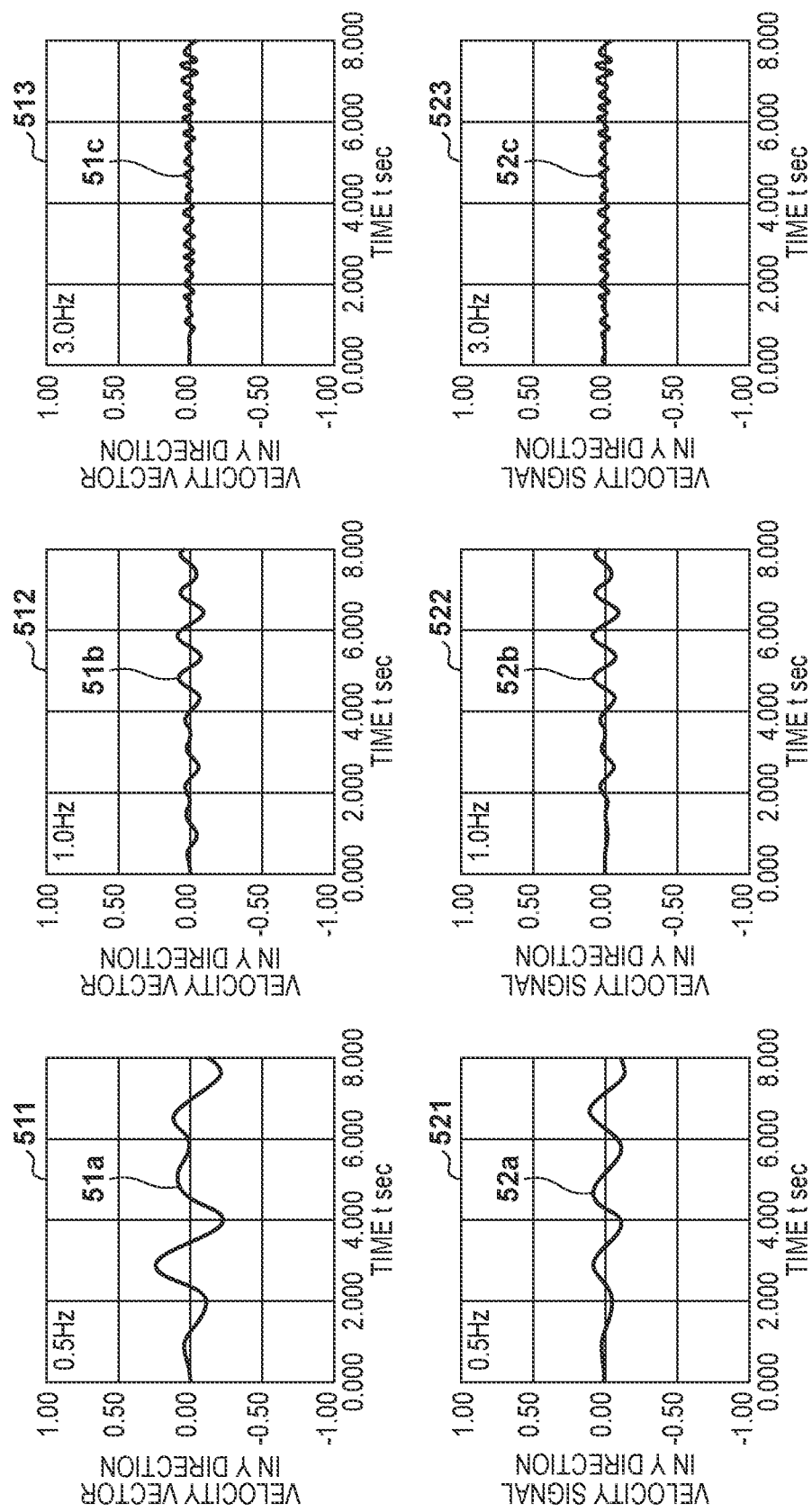

FIGS. 5A to 5D are examples showing the concept of velocity vectors and velocity signals in different bands in each of the x direction and the y direction. As shown in FIGS. 5A and 5B, the correlation between a waveform 51a shown in a graph 511, obtained by extracting a 0.5 Hz component of a waveform 51 of a velocity vector in the y direction shown in a graph 510, and a waveform 52a shown in the graph 521, obtained by extracting a 0.5 Hz component of a waveform 52 of a velocity signal in the y direction shown in a graph 520, is not high. On the other hand, the correlation between a waveform 51b shown in a graph 512, obtained by extracting a 1.0 Hz component of the waveform 51, and a waveform 52b in a graph 522, obtained by extracting a 1.0 Hz component of the waveform 52, and the correlation between a waveform 51c shown in a graph 513, obtained by extracting a 3.0 Hz component of the waveform 51, and a waveform 52c shown in a graph 523, obtained by extracting a 3.0 Hz component of the waveform 52, are both high. Therefore, it can be said that the reliability of the velocity vector is high at 1.0 Hz and 3.0 Hz in the y direction.

Further, as shown in FIGS. 5C and 5D, the correlation between a waveform 53a shown in a graph 531, obtained by extracting a 0.5 Hz component of a waveform 53 of a velocity vector in the x direction of a graph 530, and a waveform 54a shown in a graph 541, obtained by extracting a 0.5 Hz component of a waveform 54 of a velocity signal in the x direction of a graph 540, is relatively high, and the correlation between a waveform 53b shown in a graph 532, obtained by extracting 1.0 Hz component of the waveform 53, and a waveform 54b shown in a graph 542, obtained by extracting a 1.0 Hz component of the waveform 54, is high. On the other hand, the correlation between a waveform 53c shown in a graph 533, obtained by extracting a 3.0 Hz component of the waveform 53, and a waveform 54c shown in a graph 543, obtained by extracting a 3.0 Hz component of the waveform 54, is not high. Therefore, it can be said that the reliability of the velocity vector is high at 0.5 Hz and 1.0 Hz in the x direction.

Therefore, it can be said that the reliability of the velocity vector is highest at 1.0 Hz at which correlations are high both in the x and y directions.

In this manner, the process of obtaining a frequency band having a high correlation with the velocity signal is performed for each of the velocity vectors obtained from different motion vectors in the imaging screen, and the most reliable correlation value among those of frequency components is determined as the representative correlation value of the motion vectors corresponding to the velocity vectors.

Figure 3:
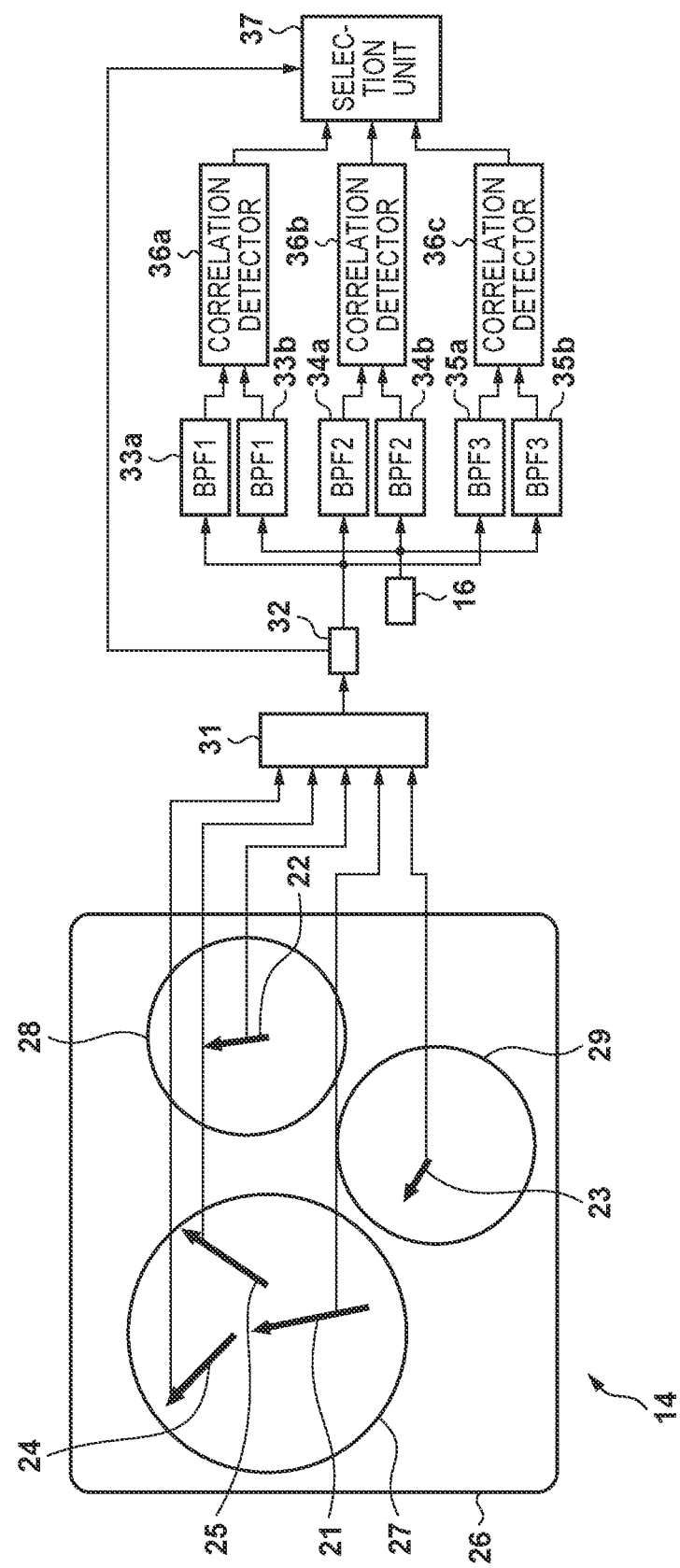
FIG. 3 is an exemplary view for explaining processing of motion vectors by the image stabilization system according to the first embodiment.

FIG. 3 shows the processing described above. After dividing the image signal by a division unit 31, the velocity vectors 21' to 25' corresponding to the motion vectors 21 to 25 obtained by the motion vector detection unit 32 are processed by the BPFs 33a, 34a, and 35a to extract each frequency component. Further, the velocity signal from the acceleration detection unit 16 is processed by the BPFs 33b, 34b, and 35b to extract each frequency component. Then, a correlation value of each frequency component of each velocity vector is obtained by correlation detectors 36a, 36b, and 36c. A selection unit 37 compares the correlation values obtained from the correlation detectors 36a, 36b, and 36c, and selects a highly reliable motion vector from the motion vectors 21 to 25. In a case where there are representative correlation values which are close to each other, the reliability of the motion vector in the main subject area is increased. Note that a main subject determining method for determining the main subject area includes, for example, a method in which a subject area closer to the center of the screen is set as the main subject area, a method in which an area including the closest subject in the screen is set as the main subject area, and a method in which a focusing area of the auto focus function is set as the main subject area.

Returning to FIG. 1, the selection unit 37 selects the most reliable motion vector from the motion vectors in respective areas output from the motion vector detection unit 32, and a driving unit 15 drives the image stabilizing lens 13 based on the motion vector signal to perform image stabilization.

In general, motion vectors are obtained in the camera body 11a having the image sensor 14, and image stabilization is performed using an appropriate image stabilization method corresponding to the type of the interchangeable lens, so that highly accurate image stabilization can be performed. In the present embodiment, a description has been given of a configuration in which a motion vector is obtained in the camera body 11a and the image stabilizing lens 13 in the interchangeable lens 11b is driven to perform image stabilization. However, the present invention is not limited to this. For example, the image sensor 14 in the camera body 11a may be driven in a plane orthogonal to the optical axis 10 to perform image stabilization, or electronic image stabilization in which a cropping area is adjusted for each frame may be performed.

Figure 6:
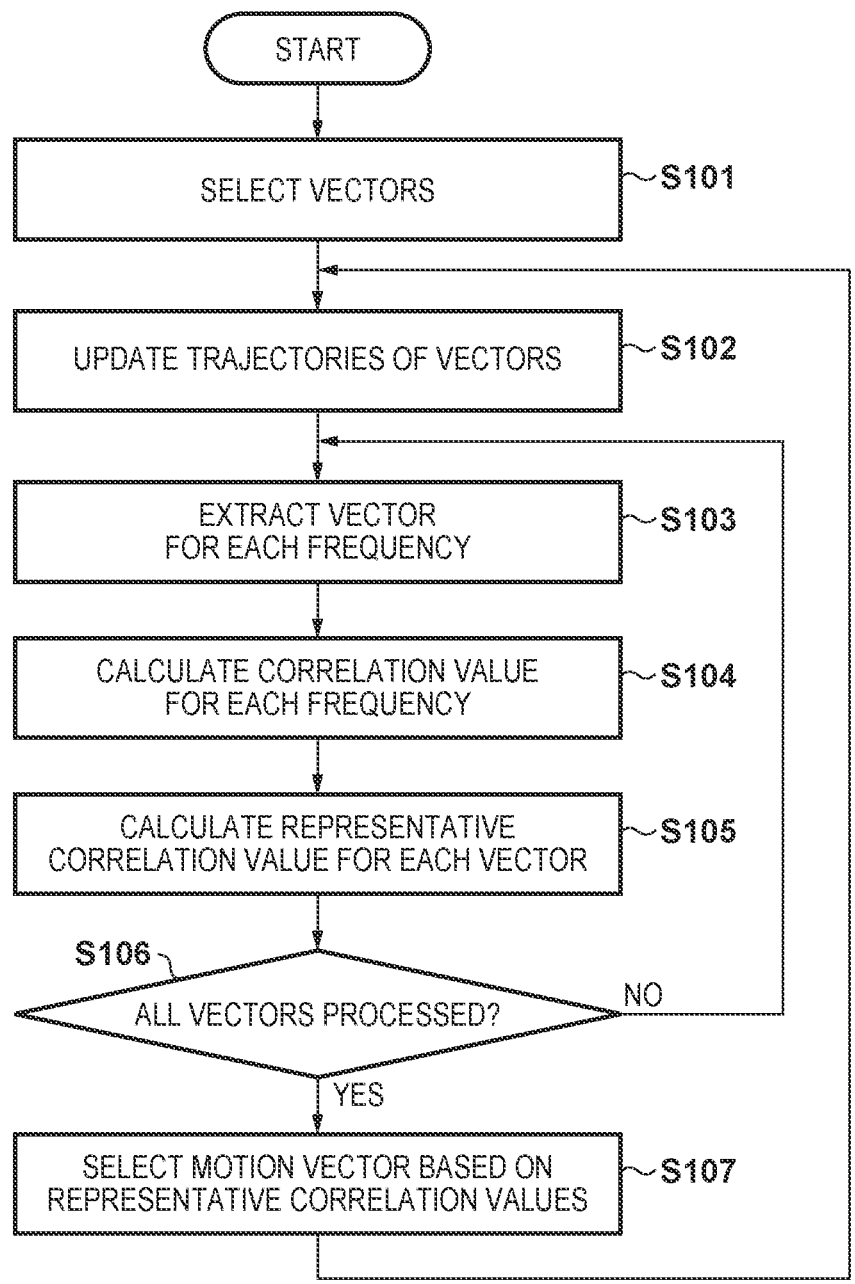
FIG. 6 is a flowchart of a motion vector selection processing according to the first embodiment.

FIG. 6 is a flowchart of a motion vector selection processing according to the first embodiment. This process starts when the camera body 11a starts capturing an image. In a case where the composition changes, the operation is restarted.

Figure 7:
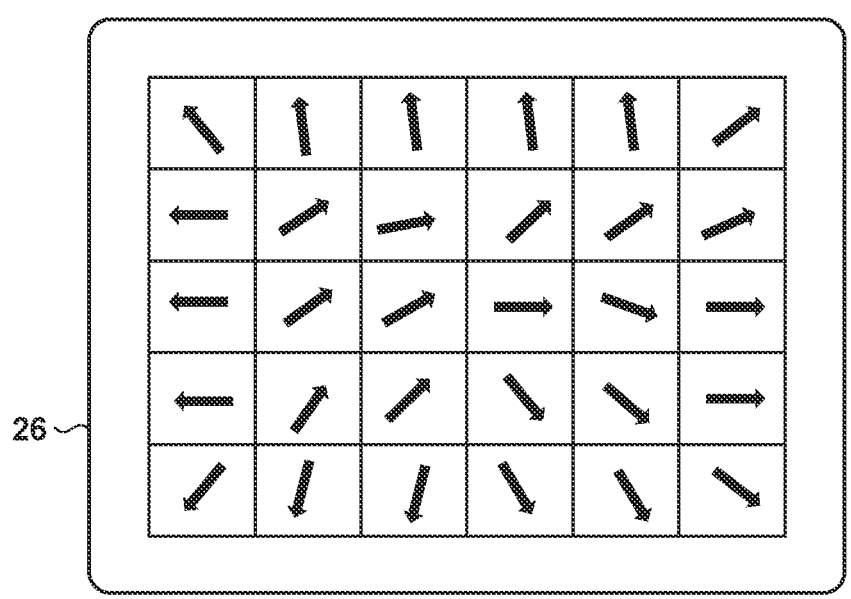
FIG. 7 is a schematic diagram illustrating an example of motion vectors of divided areas according to the first embodiment.

In step S101, the imaging screen is divided into a plurality of areas, and a motion vector is detected for each area. FIG. 7 shows an example in which a motion vector is obtained for each of a plurality of areas. Then, the obtained plurality of motion vectors are divided into groups according to their directions and amounts, and, for example, five groups are selected in descending order of the area of the divided groups. Then, a representative motion vector of each selected group is obtained. As an example, an average of the motion vectors of the areas divided into the same group is set as a representative motion vector. This operation is performed by, for example, the division unit 31 in FIG. 3.

In step S102, the trajectories of the velocity vectors obtained from the motion vectors of the selected groups are updated. As a result, the waveforms 51 and 53 shown in the graph 510 of FIG. 5A and the graph 530 of FIG. 5C, respectively, are obtained.

In step S103, each frequency component is extracted for each of the x direction and the y direction of the velocity vector of each selected group. As a result, the waveforms 51a to 51c shown in the graphs 511 to 513 in FIG. 5B and the waveforms 53a to 53c shown in the graphs 531 to 533 in FIG. 5D are obtained. At this time, each frequency component is simultaneously extracted from the velocity signal, and the waveforms 52a to 52c shown in the graphs 521 to 523 in FIG. 5B and the waveforms 54a to 54c shown in the graphs 541 to 543 in FIG. 5D are obtained.

In step S104, the velocity vector and the velocity signal obtained in step S103 are compared in the x direction and the y direction for each frequency component, and correlation values are obtained.

In step S105, a representative correlation value of each group is obtained using the correlation value of each frequency component in each of the x direction and they direction obtained in step S104. Here, as described with reference to FIGS. 5A to 5D, a correlation value having a high correlation in a frequency band in both the x direction and the y direction is set as a representative correlation value of the group.

In step S106, steps S103 to S105 are repeated until representative correlation values of all the groups selected in step S101 are obtained.

In step S107, the group having the highest representative correlation value is selected from the representative correlation values of the respective groups. Then, image stabilization is performed using the motion vector of the selected group. For example, in FIG. 2, image stabilization is performed using the motion vector 21 of the group of the subject 27 having the highest representative correlation value.

As described above, according to the first embodiment, the motion vector is divided into a plurality of different frequency components, the correlation with the velocity signal is obtained, and the motion vector is selected by using the correlation values, thereby performing highly accurate image stabilization.

<Modification>

When calculating the correlation value of each frequency band in step S104 of FIG. 6 in the above-described first embodiment, a weighted correlation value may be obtained by applying a weighting coefficient to the waveform of the velocity vector of each frequency band.

In this case, first, a weighting coefficient for each frequency component is calculated based on a waveform obtained by separating the output of the acceleration detection unit 16 into each frequency component. The weighting coefficient is obtained by calculating the difference between the maximum value and the minimum value or energy of the waveform obtained by separating the output of the acceleration detection unit 16 into each frequency component. Then, the obtained weighting coefficient is multiplied by the correlation value of the corresponding frequency band of each velocity vector, and among the obtained correlation values of the different frequency bands, the most reliable correlation value among those in the different frequency bands is determined as the representative correlation value of the motion vector corresponding to the velocity vector.

By weighting the correlation values in this manner, a motion vector can be selected in consideration of a dominant frequency band as a shake component, so that more accurate image stabilization can be performed.

Second Embodiment

Next, a second embodiment of the present invention will be described.

In shooting a still image, there is a problem that a motion vector cannot be detected during exposure because no image signal is obtained during the exposure. The second embodiment is different from the first embodiment in that an angular velocity detection unit is further provided for the purpose of performing highly accurate image stabilization even during exposure for still image shooting. Specifically, a correction value of a signal obtained from the angular velocity detection unit is obtained using a motion vector before shooting a still image, and image stabilization during exposure for still image shooting is performed using a signal corrected using the correction value.

Figure 8:
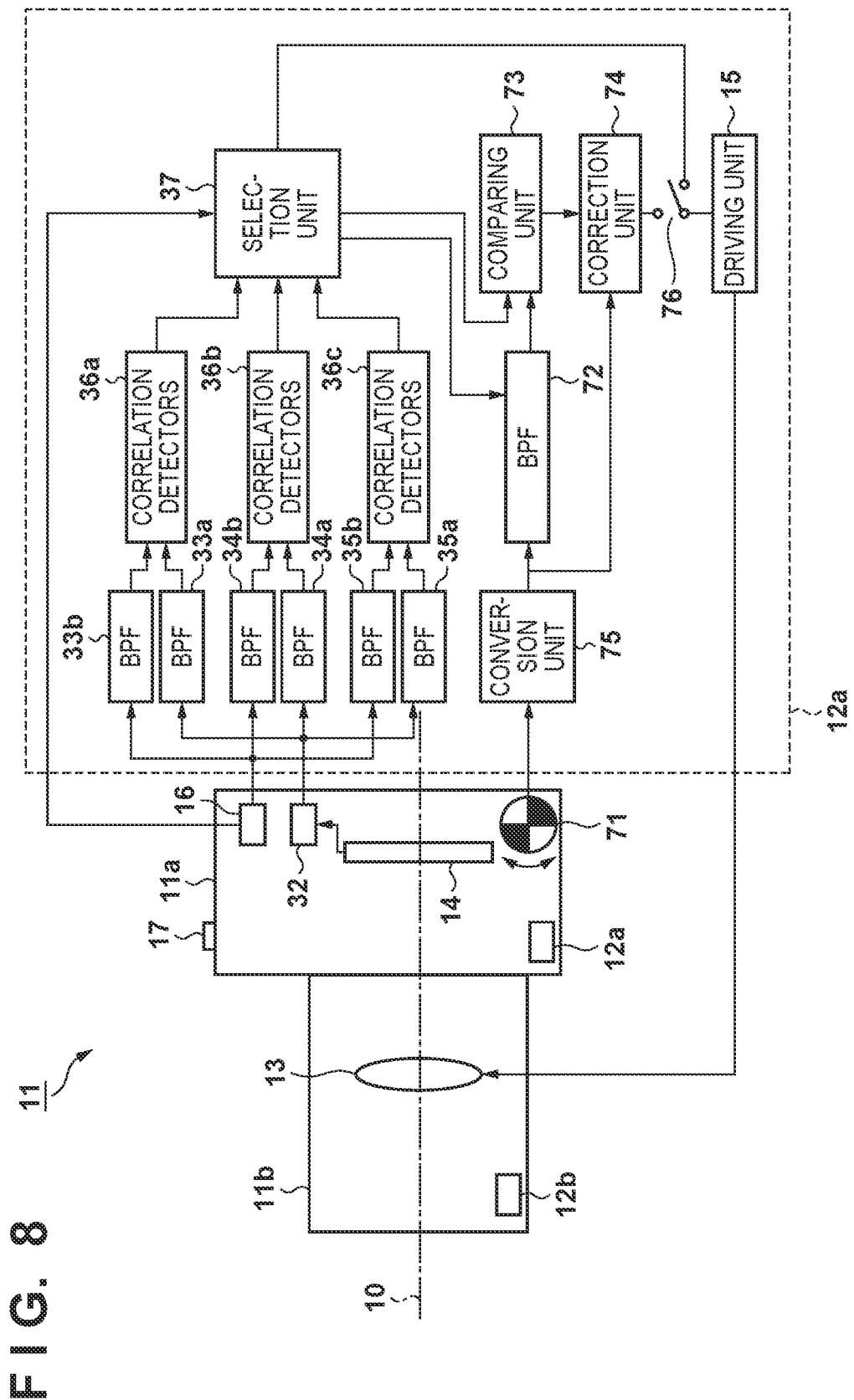
FIG. 8 is a block diagram illustrating a control configuration of an image stabilization system in an image capturing system according to a second embodiment.

FIG. 8 is a block diagram illustrating a control configuration of an image stabilization system in an image capturing system 11 which includes a camera body 11a and an interchangeable lens 11b used by being attached to the camera body 11a according to the second embodiment. Note that the same configurations as those in FIG. 1 are denoted by the same reference numerals, and description thereof will be omitted. Compared with the configuration shown in FIG. 1, the camera body 11a is further provided with an angular velocity detecting unit 71 such as a gyro sensor, and the control in the camera CPU 12a is different. Note that the angular velocity detection unit 71 performs detection in the detection directions about three orthogonal axes (about the x-axis, the y-axis, and the z-axis). Therefore, in the subsequent processing, the processing is performed on each of a rotation component about the x-axis, a rotation component about y-axis, and a rotation component about the z-axis.

An angular velocity signal output from the angular velocity detection unit 71 is input to a band-pass filter (BPF) 72 via a conversion unit 75 that converts the angular velocity into an on-imaging-plane velocity. The conversion unit 75 converts the angular velocity signal into an on-imaging-plane velocity signal indicating the velocity of movement on the image sensor 14 using the sensitivity of the imaging optical system and the focal length of the imaging optical system.

Figure 9:
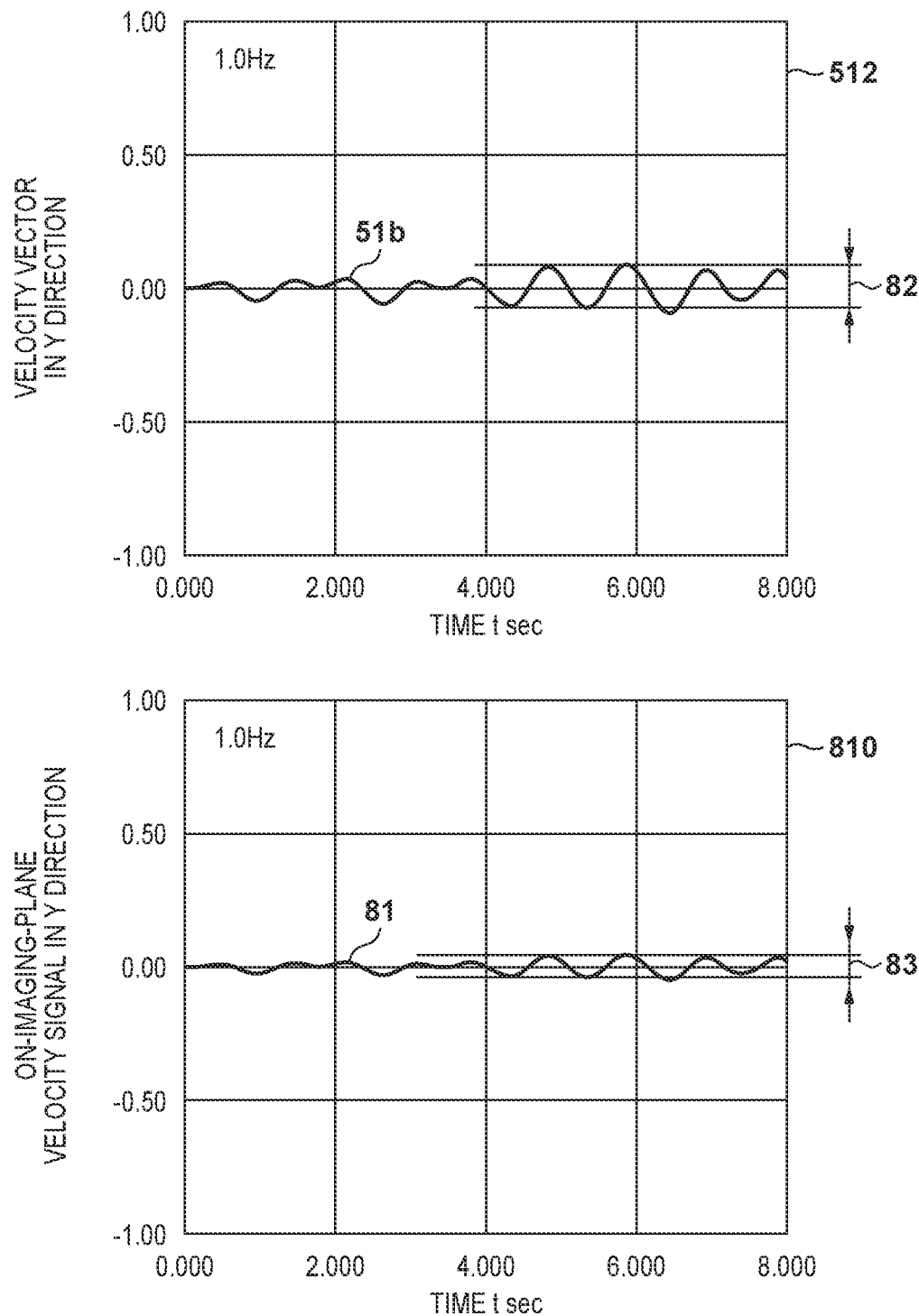
FIG. 9 is an explanatory diagram of band division of a velocity vector and a degree of correlation according to the second embodiment.

The frequency to be extracted by the BPF 72 is set to the frequency band in which motion vector having the highest reliability is selected by the selection unit 37. For example, in the examples shown in FIGS. 5A to 5D, the motion vector that shows the highest reliability is of 1 Hz as shown by the waveform 51b shown in the graph 512 of FIG. 5B and the waveform 53b shown in the graph 532 of FIG. 5D. In this case, the 1 Hz component of the on-imaging-plane velocity signal output from the conversion unit 75 is extracted by the BPF 72. As a result, a waveform 81 shown in a graph 810 at the lower part of FIG. 9 is obtained. Note that the graph 512 at the upper part of FIG. 9 is a graph of the waveform 51b shown in the graph 512 at a frequency of 1 Hz in FIG. 5B, and the waveform 81 will be compared with the waveform 51b below.

The on-imaging-plane velocity signal output from the conversion unit 75 and the velocity vector show a high correlation in this frequency band, but have different amplitudes due to the effects of translational shake. Therefore, a comparing unit 73 obtains the amplitude 82 of the 1 Hz component waveform 51b of the velocity vector for, for example, 2 seconds, compares the amplitude 82 with the amplitude 83 of the waveform 81 similarly obtained, and sets the ratio as a correction value. A correction unit 74 corrects the on-imaging-plane velocity signal using the correction value thus obtained.

A switch 76 sends the motion vector selected by the selection unit 37 to the driving unit 15 in a case where a motion vector can be obtained, and sends the on-imaging-plane velocity signal corrected by the correction unit 74 to the driving unit 15 in a case where a motion vector cannot be obtained as in the case of still image exposure.

The driving unit 15 drives the image stabilizing lens 13 based on the corrected result of the on-imaging-plane velocity signal to perform image stabilization.

As described above, by using the correction value obtained in advance using the motion vector, image stabilization can be performed with high accuracy even during still image exposure in which a motion vector cannot be detected.

FIG. 10 is a flowchart showing an image stabilization process in the second embodiment. This process starts when the main power of the camera is turned on or when the release button 17 is half-pressed.

In step S201, image stabilization is performed using the motion vector selected as described in the first embodiment. At this time, image stabilization, such as optical image stabilization by the image stabilizing lens 13 or image sensor 14 or electronic image stabilization by image clipping, is performed.

In step S202, a frequency band of the velocity vector having the highest reliability selected in step S201 is set as a set frequency, and a signal of this frequency component is extracted from the on-imaging-plane velocity signal.

In step S203, the on-imaging-plane velocity signal (waveform 81 in FIG. 9) extracted in step S202 is compared with the frequency component (waveform 51b in FIG. 9) of the selected velocity vector having the highest reliability, and the ratio is used as a correction value. The correction value is updated each time the correction value is obtained in this process.

In step S204, it is determined whether or not the release button 17 has been fully pressed (SW2 ON), which is an instruction to start the still image exposure, and the process waits until the SW2 is turned on by repeating the processes in steps S201, S202 and S203 are repeated. When SW2 is turned on, the process proceeds to step S205.

In step S205, the on-imaging-plane velocity signal from the conversion unit 75 is corrected with the correction value updated in step S203, and based on the corrected value, the driving unit 15 drives the image stabilizing lens 13 to start image stabilization.

In step S206, the process waits until the exposure of the still image is completed by repeating the processes in steps S205 and S206, and returns to step S201 when the exposure of the still image is completed.

As described above, according to the second embodiment, in addition to the same effects as those of the first embodiment, highly accurate image stabilization can be performed even in a state where a motion vector cannot be acquired as in the case of still image shooting.

In the first embodiment, image stabilization is performed using the full band signal of the selected motion vector (waveform 51 in FIG. 4). On the other hand, in the second embodiment, since the correction value is obtained using the angular velocity signal in the same frequency band as the motion vector (the waveform 51b in FIG. 4) extracted in the desired frequency band, a more reliable correction value can be obtained.

Other Embodiments

The present invention can be applied to a system including a plurality of devices (for example, a camera head, an image stabilization device, and an information processing device), or to an apparatus including one device (for example, an image capturing apparatus).

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-104795, filed on Jun. 4, 2019 which is hereby incorporated by reference herein in its entirety.

What is claimed is:

1. An image stabilization apparatus comprising:
  a first extraction unit that extracts first signals of a plurality of different frequency components from each of a plurality of motion vectors obtained from an image signal output from an image sensor;
  a second extraction unit that extracts second signals of the plurality of different frequency components from a detection signal of a detected shake of an apparatus;
  an acquisition unit that acquires correlation values between the first signals of the plurality of motion vectors and the second signal for each of the frequency components;
  a selection unit that selects at least one of the plurality of motion vectors based on the correlation values each for each of the frequency components; and
  an image stabilization unit that performs image stabilization using the motion vector selected by the selection unit,
  wherein each unit is implemented by one or more processors, circuitry or a combination thereof.

2. The image stabilization apparatus according to claim 1, wherein the selection unit selects the correlation value based on reliabilities of the correlation values of the frequency components for each of the plurality of motion vectors, and selects at least one of the plurality of motion vectors based on the selected correlation value.

3. The image stabilization apparatus according to claim 2, wherein the selection unit selects most reliable correction value among the correlation values of the frequency components for each of the plurality of motion vectors.

4. The image stabilization apparatus according to claim 2, wherein the selection unit selects a motion vector having highest correlation value among correlation values each selected for each of the plurality of motion vectors.

5. The image stabilization apparatus according to claim 2 further comprising a calculation unit that calculates weighting coefficients for the frequency components, respectively, based on the detection signal,
  wherein the selection unit selects one of the correlation values multiplied by the weighting coefficients for the respective frequency components based on the reliabilities of the correlation values, and wherein the calculation unit is implemented by one or more processors, circuitry or a combination thereof.

6. The image stabilization apparatus according to claim 1 further comprising:

a calculation unit that calculates a correction value from a ratio between an amplitude of an angular velocity signal indicating shake of the apparatus and an amplitude of the motion vector selected by the selection unit; and a correction unit hat corrects the angular velocity signal using the correction value, wherein, in a case where no image signal is obtained from the image sensor, the image stabilization unit performs image stabilization using the angular velocity signal corrected by the correction unit, and wherein each unit is implemented by one or more processors, circuitry or a combination thereof.

7. An image capturing apparatus comprising:

an image stabilization apparatus having:

a first extraction unit that extracts first signals of a plurality of different frequency components from each of a plurality of motion vectors obtained from an image signal output from an image sensor;

a second extraction unit that extracts second signals of the plurality of different frequency components from a detection signal of a detected shake of an apparatus;

an acquisition unit that acquires correlation values between the first signals of the plurality of motion vectors and the second signal for each of the frequency components;

a selection unit that selects at least one of the plurality of motion vectors based on the correlation values each for each of the frequency components; and an image stabilization unit that performs image stabilization using the motion vector selected by the selection unit; and the image sensor, wherein each unit is implemented by one or more processors, circuitry or a combination thereof.

8. An image stabilization method comprising:

extracting first signals of a plurality of different frequency components from each of a plurality of motion vectors obtained from an image signal output from an image sensor;

extracting second signals of the plurality of different frequency components from a detection signal of a detected shake of an apparatus;

acquiring correlation values between the first signals of the plurality of motion vectors and the second signal for each of the frequency components;

selecting at least one of the plurality of motion vectors based on the correlation values each for each of the frequency components; and performing image stabilization using the selected motion vector.

* * * * *